(12) United States Patent
Zee et al.

(10) Patent No.: US 11,758,573 B2
(45) Date of Patent: Sep. 12, 2023

(54) METHODS, NETWORK ASSISTANCE NODE, WIRELESS DEVICE, NETWORK NODE AND OPPOSITE NODE, FOR HANDLING DATA COMMUNICATION BETWEEN THE WIRELESS DEVICE AND THE OPPOSITE NODE

(71) Applicant: Telefonaktiebolaget LM Ericsson (publ), Stockholm (SE)

(72) Inventors: Oscar Zee, Stockholm (SE); Ann-Christine Eriksson, Enköping (SE); Marcus Ihlar, Älvsjö (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 106 days.

(21) Appl. No.: 16/758,690

(22) PCT Filed: Dec. 5, 2017

(86) PCT No.: PCT/SE2017/051219
§ 371 (c)(1),
(2) Date: Apr. 23, 2020

(87) PCT Pub. No.: WO2019/083421
PCT Pub. Date: May 2, 2019

(65) Prior Publication Data
US 2020/0344767 A1    Oct. 29, 2020

Related U.S. Application Data

(60) Provisional application No. 62/576,092, filed on Oct. 24, 2017.

(51) Int. Cl.
*H04W 28/24* (2009.01)
*H04W 72/542* (2023.01)
(Continued)

(52) U.S. Cl.
CPC ......... *H04W 72/542* (2023.01); *H04W 28/24* (2013.01); *H04W 72/51* (2023.01); *H04W 72/541* (2023.01)

(58) Field of Classification Search
CPC . H04W 28/24; H04W 72/048; H04W 72/082; H04W 72/51; H04W 72/541
See application file for complete search history.

(56) References Cited

U.S. PATENT DOCUMENTS 9,001,769 B1    4/2015   Park et al.
10,148,340 B1 *  12/2018  Bales ................ H04W 76/25
(Continued)

FOREIGN PATENT DOCUMENTS

WO    WO-2012055114 A1 *  5/2012  ........... H04L 63/123

OTHER PUBLICATIONS

International Search Report and Written Opinion issued in International Application No. PCT/SE2017/051219 dated Jul. 12, 2018 (11 pages).

(Continued)

*Primary Examiner* — Michael Thier
*Assistant Examiner* — Prince A Mensah
(74) *Attorney, Agent, or Firm* — Rothwell, Figg, Ernst & Manbeck, P.C.

(57) ABSTRACT

A network assistance node (300), a wireless device (302), a network node (304), an opposite node (306) and methods therein, for handling communication of data between the wireless device and the opposite node over a radio bearer in a cell. When detecting (3:2) that a potential data class is requested which tolerates a certain delay for delivering the data, the network assistance node obtains (3:5) from the network node availability of a potential data bearer dedicated for the potential data class, which availability is dependent on whether a cost related parameter associated (Continued)

with the wireless device fulfils a threshold condition. The network assistance node then reports (3.6) availability of the potential data class to the wireless device and the opposite node, indicating that the potential data bearer is available for data of the potential data class.

19 Claims, 7 Drawing Sheets

(51) Int. Cl.
*H04W 72/51* (2023.01)
*H04W 72/541* (2023.01)

(56) References Cited

U.S. PATENT DOCUMENTS

| | | | | |
|---|---|---|---|---|
| 2009/0059937 | A1* | 3/2009 | Kanada | H04L 47/10 370/401 |
| 2012/0287873 | A1* | 11/2012 | Liu | H04W 72/04 370/329 |
| 2013/0301475 | A1* | 11/2013 | Gasparakis | H04L 69/22 370/254 |
| 2014/0022904 | A1* | 1/2014 | Ahmad | H04L 47/12 370/235 |
| 2015/0282083 | A1* | 10/2015 | Jeong | H04W 52/0225 370/311 |
| 2016/0286247 | A1* | 9/2016 | Phillips | H04N 21/2662 |
| 2018/0083884 | A1* | 3/2018 | Kuang | H04L 49/9005 |
| 2019/0274054 | A1* | 9/2019 | Salem | H04W 74/006 |

OTHER PUBLICATIONS

R. Serral-Gracia et al., "An Overview of Quality of Experience Measurement Challenges for Video Applications in IP Networks*", This work was partially funded by Spanish Ministry of Science and innovation under contract TEC2009-07041, the Catalan Government under contract 2009 SGR1508 (2009), 12 pages.

QUALINET European Network on Quality of Experience in Multimedia Systems and Services, Qualinet White Paper on Definitions of Quality of Experience Output from the fifth Qualinet meeting, Version 1.2 Novi Sad, (Mar. 12, 2013) 24 pages.

* cited by examiner

METHODS, NETWORK ASSISTANCE NODE, WIRELESS DEVICE, NETWORK NODE AND OPPOSITE NODE, FOR HANDLING DATA COMMUNICATION BETWEEN THE WIRELESS DEVICE AND THE OPPOSITE NODE

CROSS REFERENCE TO RELATED APPLICATION(S)

This application is a 35 U.S.C. § 371 National Stage of International Patent Application No. PCT/SE2017/051219, filed Dec. 5, 2017, designating the United States and claiming priority to U.S. provisional application No. 62/576,092, filed on Oct. 24, 2017. The above identified applications are incorporated by reference.

TECHNICAL FIELD

The present disclosure relates generally to a network assistance node, a wireless device, a network node, an opposite node and methods therein, for handling data communication between the wireless device and the opposite node over a radio bearer.

BACKGROUND

In a wireless network, the amount of available radio resources in terms of frequency spectrum and transmission time is typically limited and it is therefore desirable to utilize the radio resources available in a cell as efficiently as possible so as to achieve high capacity and adequate performance in communication with wireless devices. It is often also desirable to reduce power consumption in battery powered wireless devices so as to minimize the need for charging their batteries.

The term "wireless network" is used in this description to denote any network comprising network nodes such as base stations, access points, eNodeBs or the like which are capable of radio communication with wireless devices, e.g. by transmitting scheduling blocks carrying reference signals and typically also various data and control information. Without limitation, the wireless network discussed herein may be a cellular network with base stations e.g. of a 5G wireless network or a WLAN network with access points.

Further, the term "wireless device" is used herein to represent a wireless communications device which could be any communication equipment that is capable of radio communication with a wireless network by sending and receiving radio signals to/from a network node of the wireless network. The wireless device discussed herein may, without limitation, be a mobile telephone, a tablet, a laptop computer or a Machine-to-Machine, M2M, device, also known as Machine Type Communication, MTC, device. Another commonly used generic term in this field is "User Equipment, UE" which could be used herein as a synonym for wireless device.

The wireless network thus comprises a number of network nodes which are operable to communicate radio signals with wireless devices over a radio interface. Depending on the type of network and terminology used, a network node of a wireless network may be referred to as a base station, radio node, E-UTRAN Node B, eNB, 5G node, base transceiver station, WLAN access point, etc. In this disclosure, the term "network node" is used without limitation to any particular type of wireless network.

It was mentioned above that it is desirable to utilize the available radio resources in a cell efficiently. Another challenge is to make sure that data sent from a data source towards a wireless device arrives "in time" at the wireless device, or conversely that data from the wireless device should arrive in time at a receiving opposite node. Some data is more delay-sensitive than other data, meaning that the delay-sensitive data must arrive at the receiver before a certain deadline after which the data is considered to be more or less useless or the quality of using the data has become too low. There are solutions where users, i.e. of wireless devices, can have different priorities so that data to a high priority user takes precedence over data to a low priority user. The high priority users also pay a higher fee per transmitted bit than the low priority users which means that the cost for transmitting a certain amount of data in terms of utilized radio resources can be higher for the high priority users than for the low priority users.

However, it is a problem that transmission of data may be associated with varying network cost per transmitted data bit for one and the same user, which cost is greatly dependent on the current radio conditions for the user's wireless device. In this description, transmission of data may involve either downlink transmission to the wireless device or uplink transmission from the wireless device. This network cost is basically independent of how important it is to get the data across to the receiver in time. As a result, data of less importance may well be equally or even more costly for the network to communicate than data of higher importance.

In this context, the term "cost" refers to how much radio resources are used in a cell or similar, and also to the amount of transmission power needed to reach the wireless device. In more detail, if the radio conditions and resulting signal quality are "poor", e.g. due to the wireless device is located far from the transmitting or receiving network node, higher transmission power is needed which generates interference in the cell, and typically also more coding bits per data bit are needed to ensure correct decoding of the data, either at the wireless device in downlink communication or at the network node in uplink communication. On the other hand, if the radio conditions are "good", such as when the wireless device is close to the network node, considerably lower transmission power and less coding bits are sufficient for successful reception and decoding, resulting in lower network cost per transmitted bit.

Another factor that could impact the network cost per transmitted bit is availability of bandwidth such that this cost is deemed to be high when the availability of bandwidth is low, and vice versa. Yet another factor that also may impact the network cost per transmitted bit is the current traffic load wherein the cost is typically higher at high traffic load than at lower traffic load.

SUMMARY

It is an object of embodiments described herein to address at least some of the problems and issues outlined above. It is possible to achieve this object and others by using methods and nodes as defined in the attached independent claims.

According to one aspect, a method is performed by a network assisting node for handling communication of data between a wireless device and an opposite node over a radio bearer in a cell of a wireless network. In this method, the network assisting node detects that a potential data class is requested for at least some of the data, the potential data class indicating that a certain delay for delivering the data can be tolerated, and then obtains, from a network node serving said cell, availability of a potential data bearer dedicated for data of said potential data class in the cell, which availability is dependent on whether at least one cost related parameter associated with the wireless device fulfils a threshold condition. The network assisting node further reports availability of the potential data class to at least one of the wireless device and the opposite node, thereby indicating that the potential data bearer can be used for communicating data of the potential data class between the wireless device and the opposite node.

According to another aspect, a network assisting node is arranged to handle communication of data between a wireless device and an opposite node over a radio bearer in a cell of a wireless network. The network assisting node is configured to detect that a potential data class is requested for at least some of the data, the potential data class indicating that a certain delay for delivering the data can be tolerated. The above detecting functionality may be realized by means of a detecting unit in the network assisting node.

The network assisting node is also configured to obtain, from a network node serving said cell, availability of a potential data bearer dedicated for data of said potential data class in the cell, which availability is dependent on whether at least one cost related parameter associated with the wireless device fulfils a threshold condition. The above obtaining functionality may be realized by means of an obtaining unit in the network assisting node.

The network assisting node is further configured to report availability of the potential data class to at least one of the wireless device and the opposite node, thereby indicating that the potential data bearer can be used for communicating data of the potential data class between the wireless device and the opposite node. The above reporting functionality may be realized by means of a reporting unit in the network assisting node.

According to another aspect, a method is performed by a wireless device for handling communication of data with an opposite node over a radio bearer in a cell of a wireless network. In this method, the wireless device sends to a network assisting node a request for potential data class for at least some of the data, the potential data class indicating that a certain delay for delivering the data can be tolerated. In response thereto, the wireless device receives from the network assisting node availability of the potential data class which availability is dependent on whether at least one cost related parameter associated with the wireless device fulfils a threshold condition. The received availability indicates that the potential data bearer can be used for communicating data of the potential data class between the wireless device and the opposite node.

In the case of uplink communication of the data, the wireless device is able to classify the data based on the received availability, and may then send the data in packets comprising a class indication indicating that the respective packets contain data of the potential data class.

According to another aspect, a wireless device is arranged to handle communication of data with an opposite node over a radio bearer in a cell of a wireless network. The wireless device is configured to send to a network assisting node a request for potential data class for at least some of the data, the potential data class indicating that a certain delay for delivering the data can be tolerated. The above sending functionality may be realized by means of a sending unit in the wireless device.

The wireless device is also configured to receive from the network assisting node availability of the potential data class which availability is dependent on whether at least one cost related parameter associated with the wireless device fulfils a threshold condition, said availability indicating that the potential data bearer can be used for communicating data of the potential data class between the wireless device and the opposite node. The above receiving functionality may be realized by means of a receiving unit in the wireless device.

The wireless device may further be configured to classify the data based on the received availability, which may be realized by means of a classifying unit in the wireless device. The wireless device may then be configured to send the data in packets comprising a class indication indicating that the respective packets contain data of the potential data class.

According to another aspect, a method is performed by a network node for handling communication of data between a wireless device and an opposite node over a radio bearer in a cell of a wireless network. In this method, the network node obtains at least one cost related parameter associated with the wireless device in the cell, and provides, to a network assisting node, availability of a potential data bearer dedicated for data of a potential data class in the cell. The potential data class indicates that a certain delay for delivering the data can be tolerated, which availability is dependent on whether the at least one cost related parameter fulfils a threshold condition.

According to another aspect, a network node is arranged to handle communication of data between a wireless device and an opposite node over a radio bearer in a cell of a wireless network. The network node is configured to obtain at least one cost related parameter associated with the wireless device in the cell, which may be realized by means of an obtaining unit in the network node.

The network node is further configured to provide, to a network assisting node, availability of a potential data bearer dedicated for data of a potential data class in the cell, the potential data class indicating that a certain delay for delivering the data can be tolerated, which availability is dependent on whether the at least one cost related parameter fulfils a threshold condition. The above providing functionality may be realized by means of a providing unit in the network node.

According to another aspect, a method is performed by an opposite node for handling communication of data with a wireless device which data is communicated over a radio bearer in a cell of a wireless network. In this method, the opposite node receives availability of a potential data class, the potential data class indicating that a certain delay for delivering the data can be tolerated. The received availability indicates that a potential data bearer can be used for communicating data of the potential data class between the wireless device and the opposite node, and said availability is dependent on whether at least one cost related parameter associated with the wireless device fulfils a threshold condition.

When the data is to be communicated from the opposite node to the wireless device, the opposite node classifies the data based on the received availability, and sends the data in packets comprising a class indication indicating that the respective packets contain data of the potential data class.

According to another aspect, an opposite node is arranged to handle communication of data with a wireless device which data is communicated over a radio bearer in a cell of a wireless network. The opposite node is configured to receive availability of a potential data class, the potential data class indicating that a certain delay for delivering the data can be tolerated. The availability indicates that a potential data bearer can be used for communicating data of the potential data class between the wireless device and the opposite node, and the availability is dependent on whether at least one cost related parameter associated with the wireless device fulfils a threshold condition. The above receiving functionality may be realized by means of a receiving unit in the opposite node.

The opposite node is further configured to classify the data based on the received availability, and to send the data in packets comprising a class indication indicating that the respective packets contain data of the potential data class. The above classifying and sending functionalities may be realized by means of a classifying unit and a sending unit, respectively, in the opposite node.

The above methods and apparatuses may be configured and implemented according to different optional embodiments to accomplish further features and benefits, to be described below.

A computer program is also provided which comprises instructions which, when executed on at least one processor, cause the at least one processor to carry out either of the methods described above. A program carrier containing the above computer program is further provided, wherein the program carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
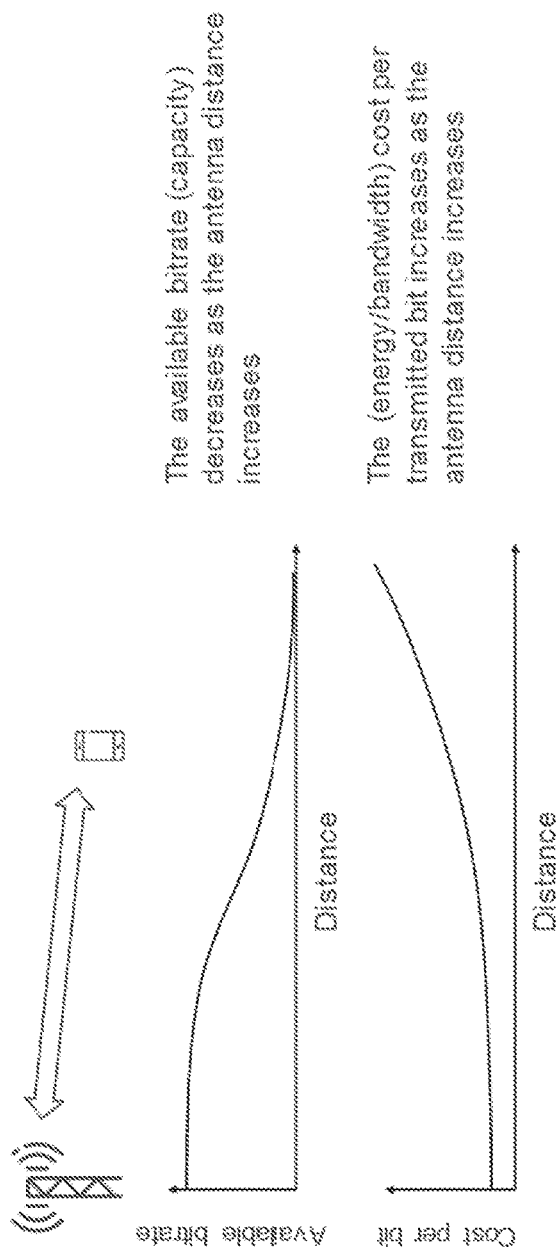
FIG. 1 are two diagrams illustrating how the available bitrate and network cost per transmitted bit, respectively, vary with distance between transmitting and receiving antennas.

Briefly described, a solution is provided to enable more efficient use of radio resources in a wireless network when data is communicated between a wireless device and an opposite node over a radio bearer in a cell of the wireless network. This solution involves functionality in the wireless device and in the opposite node, and also in a network assisting node and in a network node serving said cell including transmitting or receiving the data wirelessly to/from the wireless device. A radio bearer used for transmitting the data, either from the network node or from the wireless device, may also be generally referred to as a "data bearer" which will be described in more detail below.

Efficient use of radio resources can be accomplished by using a specific radio bearer, herein referred to as a "potential data bearer", which is dedicated for communicating data that can be classified as not being delay sensitive, referred to as a "potential data class", which implies that a certain delay for delivering the data can be tolerated. There may also be other data bearers available for more delay-sensitive data such as a real-time bearer with highest priority and a semi-real time bearer with medium priority that is higher than for the potential data bearer which has the lowest priority. This way, the data traffic to or from a specific wireless device can be separated based on the data's delay-sensitivity and be transmitted on the respective data bearers.

In this solution, the current availability of the potential data bearer to the wireless device in a cell is dependent on whether a cost related parameter associated with the wireless device fulfils a threshold condition or not. The cost related parameter can be determined, e.g. based on measurements, and basically indicates the above-mentioned network cost per transmitted data bit. A cost related parameter and associated network cost may be dependent on e.g. the current radio conditions, the current load in the cell, the current amount of free bandwidth or radio resources, the transmit power needed for the transmission and its resulting interference in the present cell and in other neighbouring cells, to mention a few non-limiting examples. Such network costs are recognized as such and have been described and explained above in the background section.

The threshold condition may be that the potential data bearer is deemed available to the wireless device when one or more cost related parameters is/are above or below some predefined threshold value(s). The threshold condition may further comprise calculating some combined or aggregated value using one or more cost related parameters as input to a predefined algorithm, which value is then compared to a predefined threshold value for determination of the potential data bearer's availability. The solution is not limited to using any particular threshold condition and cost related parameter (s), either of which may be selected and configured depending on implementation.

When the cost related parameter fulfils the threshold condition and the potential data bearer is noted to be available in the cell, any data of the potential data class can be wirelessly communicated to or from the wireless device over the potential data bearer. But when the potential data bearer is not available, e.g. due to high traffic load, lack of free bandwidth/resources, poor radio conditions, etc., any data of the potential data class may be communicated over another data bearer that is intended for real time or semi-real time data that is more or less sensitive to delay. Alternatively, transmission of data of the potential data class can be postponed until the potential data bearer becomes available as long as the data can tolerate such a delay.

In the following description, the term "opposite node" is used to represent any communication node that the wireless device either receives data from or transmits data to. For example, the opposite node may be a data source such as a content provider or the like sending downloaded data to the wireless device, or a data receiver such as a cloud data storage or the like receiving uploaded data from the wireless device. In this context, the opposite node can thus be seen as one end point of the data communication while the wireless device is the other end point, the network node being an intermediate node that communicates the data to/from the wireless device over a data bearer of a wireless link. As indicated above, the wireless device could be alternatively denoted "wireless communications device" throughout this description.

In some practical cases, the opposite node may be a proxy such as a HTTP proxy or similar where the data is stored or cached to be delivered to the wireless device. For example, a client may be using a service from a content provider, for receiving content (i.e. data) that is maintained at a central server but can be accessed via a proxy located at a network edge where the data is also stored. in that case, the proxy could be capable of handling potential data as described herein, while the central server may not. The proxy thus relays content from the central server to the client, and in the embodiments herein the proxy can be seen as an endpoint for the data communication.

First, some aspects and characteristics of network costs will be discussed, with reference to terminology used by the third Generation Partnership Project 3GPP. For some radio access technologies used for e.g. High Speed Packet Access HSPA, Long Term Evolution LTE, 5G and 802.11 WLAN, the achievable bitrate on both downlink and uplink is usually adapted depending on the current radio channel quality, given that the transmission power and bandwidth are constant, and no other users are sharing the same radio channel. This means that the cost in terms of consumed power and/or bandwidth to transmit a bit to or from a wireless device is higher when the wireless device is at a location with bad radio channel quality than when it is at a location with good radio channel quality.

A parameter that impacts the radio channel quality is thus the distance between the antennas of the wireless device and the serving network node. FIG. 1 illustrates two diagrams of how the available bitrate and the network cost per transmitted bit, respectively, vary with the antenna distance. In the upper diagram, it can be seen that the available bitrate (capacity) decreases as the antenna distance increases, and in the lower diagram, it can be seen that the cost per transmitted bit in terms of energy/bandwidth increases as the antenna distance increases.

With the above relationships in mind, the following conclusions may be drawn:

The bitrate capacity of a cell is depending on the location of the wireless devices in the cell, and consequently the bitrate capacity can be maximized if all the wireless devices are located with best possible radio channel quality.

The transmission power per bit in a cell is also depending on the location of the wireless devices in the cell such that the power needed increases with increasing distance, and the best energy efficiency can be achieved as well when all the wireless devices in the cell are at locations with best possible radio channel quality.

The time used for transmitting a fixed amount of data, given a fixed bandwidth and fixed power, is also depending on the location of the wireless devices in the cell. Minimum time can be achieved when a wireless device is at a location with best possible radio channel quality.

The bandwidth used for transmitting a fixed amount of data, given a fixed time and fixed power, is also depending on the location of the wireless devices in the cell. Minimum bandwidth is required when the wireless devices are at locations with best possible radio channel quality.

The energy used for transmitting a fixed amount of data, given a fixed time and fixed bandwidth, is also depending on the location of the wireless devices in the cell. Minimum energy is used when the wireless devices are at locations with best possible radio channel quality.

Another aspect of cost per transmitted bit is the available total bandwidth at a certain location. For example, in case of carrier aggregation and/or dual connectivity using different frequency bands, areas with coverage on both frequency bands will have higher available capacity than areas with single frequency band coverage. The cost for transmitting is higher in areas providing only single frequency band coverage, given that all wireless devices are capable of carrier aggregation/dual connectivity.

Besides the above-described aspects, other aspects can also be taken into consideration for estimating the cost of transmitted bits, e.g. in a network using one and the same frequency bandwidth, with wireless devices spread equally over the network, and each wireless device requires the same amount of transmitted data. However, the wireless devices can be divided into high and low priority users, where high priority users pay a higher tariff per transmitted bit than the low priority users. In this case, a cell where more high priority users are located will have a higher cost per bit as the revenue per bit will be higher in this cell than in other cells.

Figure 2:
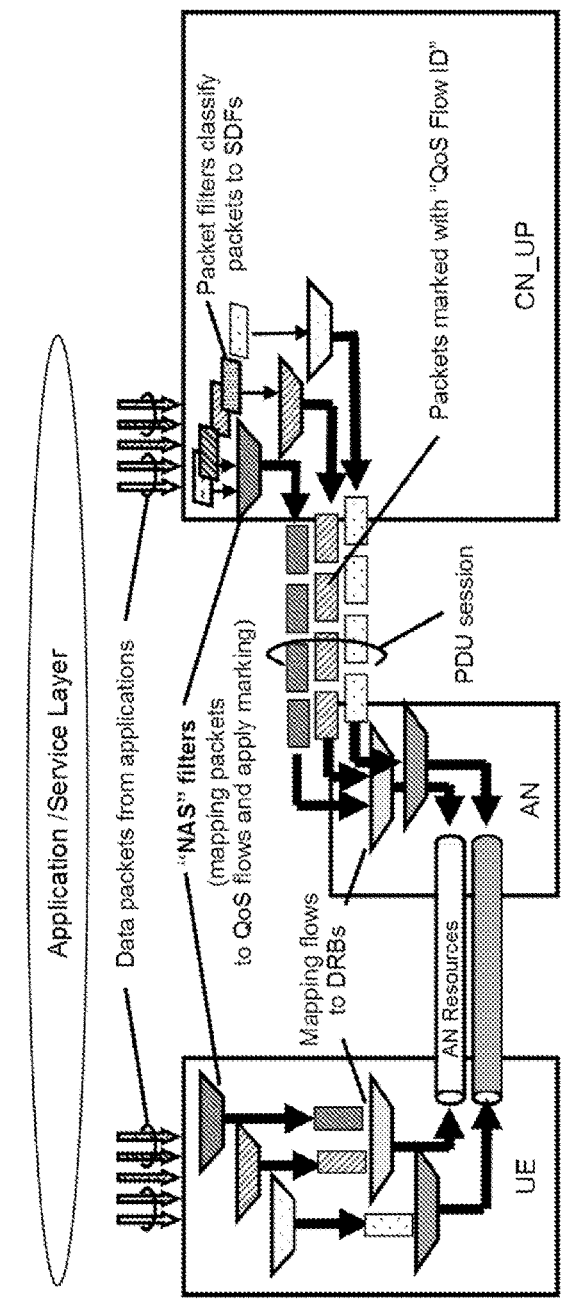
FIG. 2 is a schematic illustration of how data packets can be mapped to different Quality of Service (QoS) flows and Dedicated Radio Bearers (DRBs) in a typical 5G wireless network.

FIG. 2 illustrates schematically how data packets can be mapped to different Quality of Service (QoS) flows and Dedicated Radio Bearers (DRBs) in a typical 5G wireless network. These QoS flows and DRBs may thus be reserved for data of different corresponding priorities which may be subject to subscription and/or differentiated billing tariffs.

An example of how the solution may be employed will now be described with reference to the communication scenario illustrated in FIG. 3 involving a Network Assisting (NA) node 300, a wireless device 302 which is served by a network node 304 in a cell, and an opposite node 306 which in this example is illustrated as a data source. This example thus refers to communication of data from the data source 306 to the wireless device 302 over the network node 304.

A first action 3:1 illustrates that the wireless device 302 and the network node 304 initially communicate over a so-called default Radio Access Bearer (RAB), e.g. for establishing a connection and preparing for downlink transmission of data to the wireless device 302. It is assumed that the wireless device 302 also obtains a so-called "access method" to be used for contacting the NA node 300, which may include or otherwise point to an IP address or the like that can be used for accessing the NA node 300. The access method may be obtained in any suitable manner, e.g. by manual configuration of through receiving an SMS, which is somewhat outside the solution described herein.

In a next action 3:2, the wireless device 302 sends a request for a potential data class to the NA node 300, using the earlier obtained access method, with the purpose of enabling efficient and low-cost transmission of the data on the potential data bearer if the potential data class and bearer is/are available. For example, it may be in the interest of the user of device 302 to conduct the data communication at the lowest possible network cost which may result in lower charging for the communication. Therefore, the user as well as the wireless network will want to achieve as low cost as possible for the communication by using the potential data bearer.

The NA node 300 then sends an enquiry or the like to the network node 304, in an action 3:3, effectively asking 1) whether the network node 304 is capable of communicating over a potential data bearer dedicated for data of the potential data class, and 2) whether the potential data bearer is currently available in the cell or not. In response thereto, the network node 304 obtains or calculates the network cost for data communication to the wireless device 302 in terms of one or more cost related parameters, in a following action 3:4, and also determines whether the one or more cost related parameters fulfills the above-described threshold condition. It is assumed that this is the case here, and accordingly the network node 304 returns a message to the NA node 300 indicating availability of the potential data bearer, in another action 3:5.

A next action 3:6 illustrates that the NA node 300 reports potential data class information to both the wireless device 302 and the data source (i.e. opposite node) 306 in this case, to indicate availability of the potential data class meaning that the potential data bearer can be used for communicating data of the potential data class to the wireless device. As a result, the data source 306 will classify and send the data towards the wireless device 302 in another action 3:7, such that at least some of the data destined for the wireless device 302 is marked as belonging to the potential data class. Other data to the wireless device 302 may be classified as belonging to the other classes for real time and semi-real time data, e.g. data that is less delay-tolerant. In general, the potential data class indicates that a certain delay for delivering the data can be tolerated. Hence, all data sent from the data source 306 is marked with a class which can be utilized for differentiated transmission by the network node 304 on different data bearers as follows.

When all this data arrives at the network node 304, it transmits the data wirelessly to the wireless device 302 on different data bearers according to the classification made in the foregoing action. Hence, data marked with the potential data class is transmitted over the potential data bearer in an action 3:8A, data marked with the real time data class is transmitted over the real time data bearer in an action 3:8B, and data marked with the potential data class is transmitted over the potential data bearer in another action 3:8C. It should be noted that actions 3:8A-C may be executed independently in any suitable order and/or simultaneously.

Figure 3:
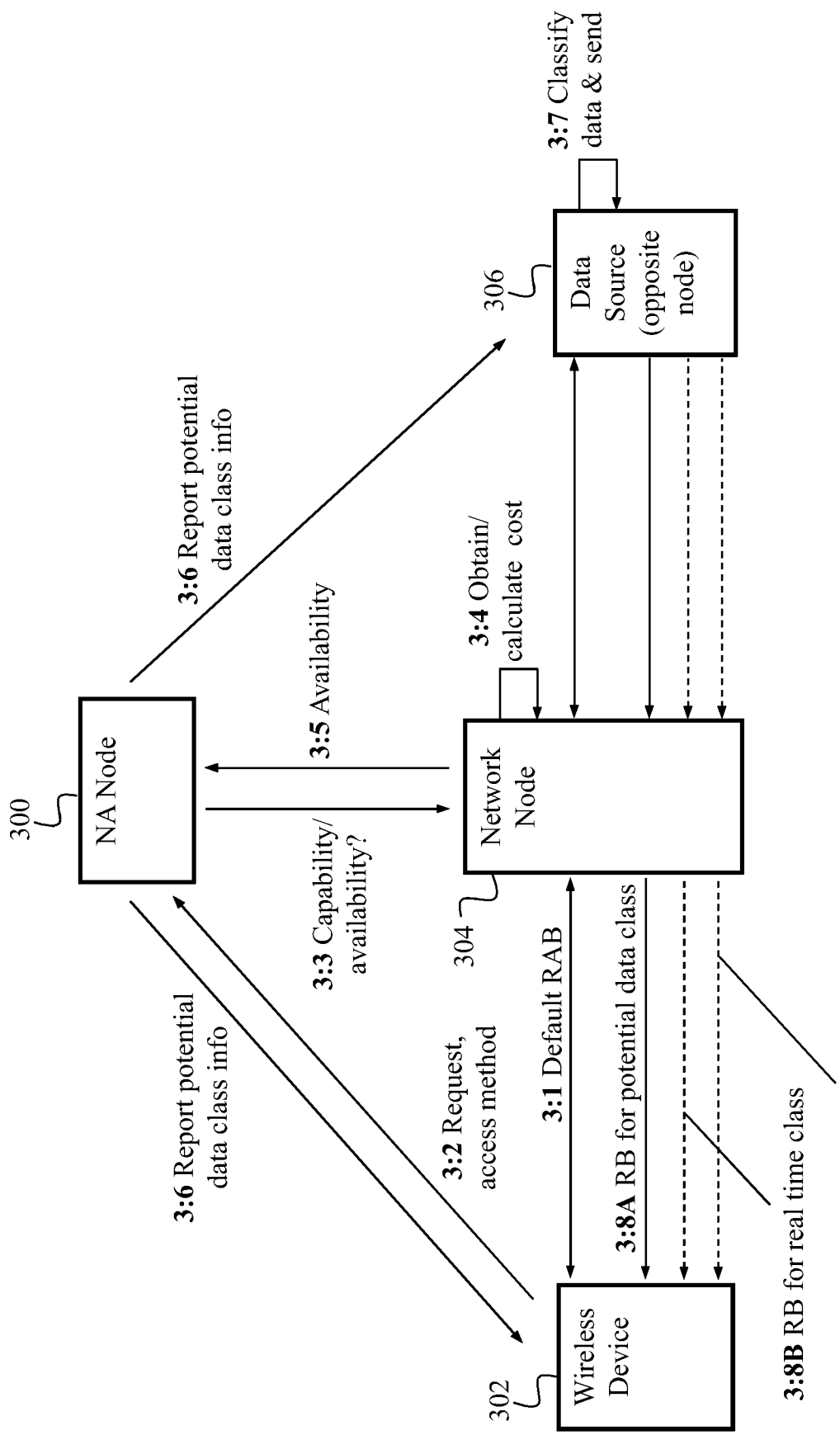
FIG. 3 is a communication scenario illustrating an example of how the solution may be employed, according to some example embodiments.

The example shown in FIG. 3 involved downlink transmission of data to the wireless device 302 where the classification of the data is made by the data source 306. A similar procedure may also be employed for uplink transmission of data from the wireless device 302 where the classification of the data would instead be made by the wireless device 302. The solution is thus generally useful for both downlink and uplink transmission of data of the potential data class over the potential data bearer.

Figure 4:
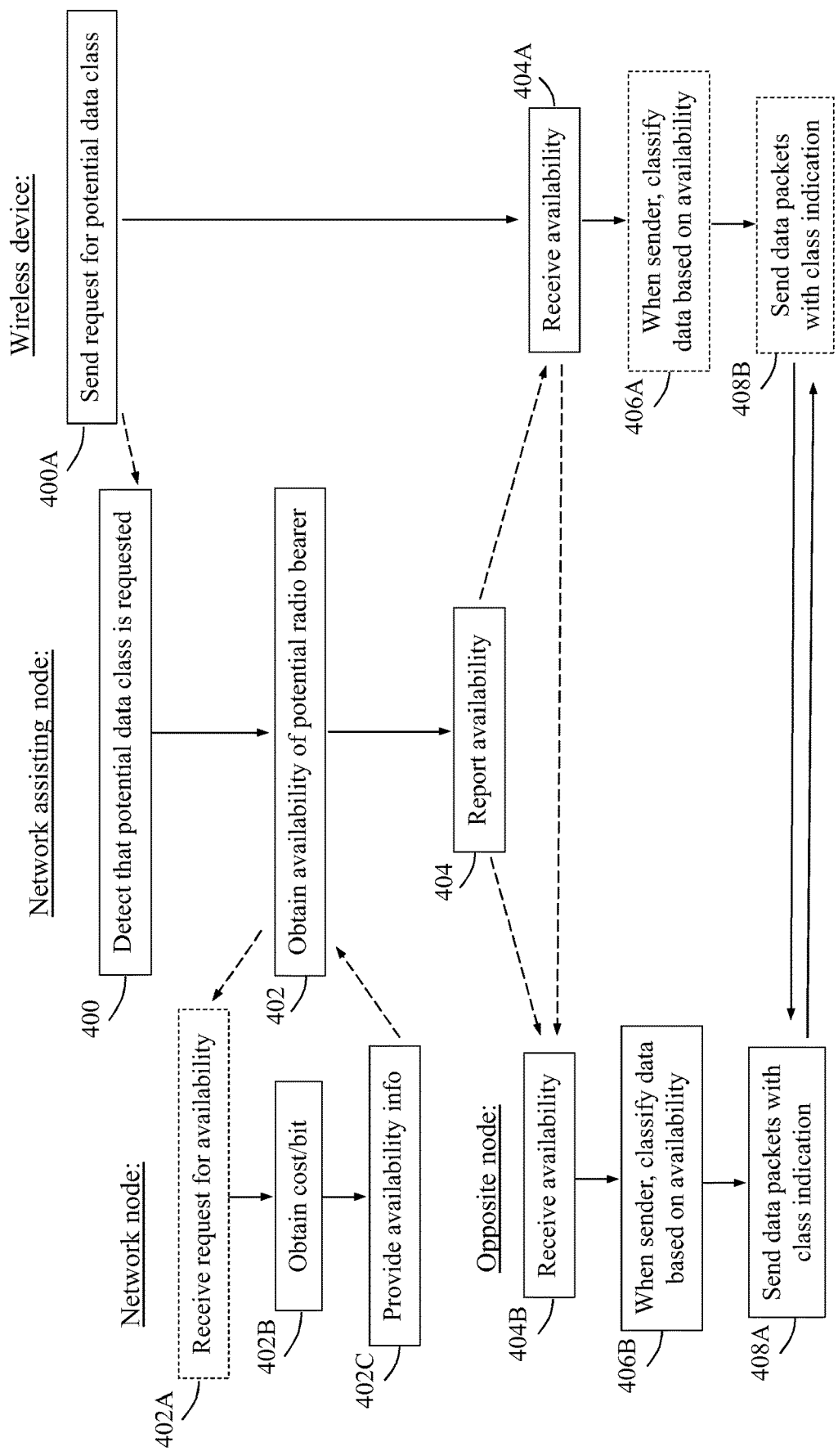
FIG. 4 contains flow charts with actions performed by a network assisting node, a wireless device, a network node and an opposite node, in a procedure for handling communication of data, according to further example embodiments.

A procedure for handling communication of data between a wireless device and an opposite node will now be described in terms of actions performed by four entities and with reference to the flow chart in FIG. 4. The entities in this procedure thus include a network assisting node which could be the above NA node 300, a wireless device which could be the above wireless device 302, a network node which could be the above network node 304, and an opposite node which could be the above data source 306. To facilitate understanding of this procedure, although without limitation, reference will also be made to these nodes in FIG. 3. Some dashed arrows are provided in FIG. 4 to indicate how different actions are related to one another.

Procedure in Network Assisting Node 300

First, the procedure of FIG. 4 will be described in terms of actions performed by the network assisting node 300 for handling communication of data between a wireless device 302 and an opposite node 306 over a radio bearer in a cell of a wireless network. In an action 400, the network assisting node 300 detects that a potential data class is requested for at least some of the data, the potential data class indicating that a certain delay for delivering the data can be tolerated. This action corresponds to the above action 3:2. For example, the potential data class may be requested directly by the wireless device 302 or it may be requested by default without a separate explicit message.

In a next action 402, the network assisting node 300 obtains, from a network node 304 serving said cell, availability of a potential data bearer dedicated for data of said potential data class in the cell, which availability is dependent on whether at least one cost related parameter associated with the wireless device fulfils a threshold condition. This action corresponds to the above action 3:3. This availability may be obtained by sending an availability request to the network node 304. According to one example embodiment, the network assisting node 300 may in this action obtain the availability of a potential data bearer by receiving from the network node 304 a potential data bearer indicator indicating a current availability and/or a predicted availability of said potential data bearer.

In a further action 404, the network assisting node 300 reports availability of the potential data class to at least one of the wireless device 302 and the opposite node 306, thereby indicating that the potential data bearer can be used for communicating data of the potential data class between the wireless device 302 and the opposite node 306. This action corresponds to the above action 3:6.

Some further optional example embodiments that could be used in this procedure will now be described. In one example embodiment, the network assisting node 300 may perform the detecting action 400 by receiving a request for potential data class from the wireless device, and said reporting action may comprise sending a potential data class indicator to at least one of the wireless device and the opposite node in response to the received request.

In further example embodiments, the potential data class indicator may comprise at least one of: an identifier of the potential data class, an indication that the potential data bearer is available, an estimated current bitrate, and a predicted forthcoming bitrate for data of the potential data class.

In some further example embodiments, the at least one cost related parameter may include any one or more of: a channel quality indicator CQI reported by the wireless device, a received signal strength indicator RSSI measured by the wireless device 302 or by the network node 304, a currently used modulation and coding scheme MCS, the number of active users in the cell, the number of active users in a neighbouring cell, mobility behaviour of the wireless device, and available bandwidth or bitrate at the wireless device's current location. The above parameters CQI and RSSI as well as the wireless device's current location are indicative of the current radio conditions experienced by the wireless device 302. The available bandwidth or bitrate at the current location is further indicative of whether there are any free radio resources that can be used for the potential data class. The number of active users in the present cell and/or in the neighbouring cell is a measure of the traffic load.

Procedure in Wireless Device 302

Second, the procedure of FIG. 4 will be described in terms of actions performed by the wireless device 302 for handling communication of data with an opposite node 306 over a radio bearer in a cell of a wireless network. In an action 400A, the wireless device 302 sends to a network assisting node 300 a request for potential data class for at least some of the data, the potential data class indicating that a certain delay for delivering the data can be tolerated. This action corresponds to the above action 3:2.

In a next action 404A, the wireless device 302 receives from the network assisting node 300 availability of the potential data class which availability is dependent on whether at least one cost related parameter associated with the wireless device 302 fulfils a threshold condition, said availability indicating that the potential data bearer can be used for communicating data of the potential data class between the wireless device 302 and the opposite node 306. This action corresponds to the above action 3:6.

Some optional example embodiments that could be used in the latter procedure of the wireless device 302 will now be described. One example embodiment is useful in the case when the wireless device 302 is the data sender and thus performs uplink transmission of the data. In this embodiment, the wireless device 302 classifies the data based on the received availability, as shown in an optional action 406A, and sends at least some of the data in packets comprising a class indication indicating that the respective packets contain data of the potential data class, as shown in another optional action 408B. In the latter action, data of the potential data class is transmitted on the potential data bearer when available.

Another example embodiment is useful in the case when the opposite node 306 is the data sender and the network node 304 performs downlink transmission of the data to the wireless device 302. In this embodiment, the wireless device 302 may forward said availability to the opposite node 306 as a basis for classification of the data, as schematically indicated by a dashed arrow from 404A to 404B. Thereby, the opposite node 306 can send the data marked with the classification and the network node 304 can transmit the data on respective data bearers to the wireless device 302, e.g. as described above for actions 3:7 and 3:8A-C, respectively.

Procedure in Network Node 304

Third, the procedure of FIG. 4 will be described in terms of actions performed by the network node 304 for handling communication of data between a wireless device 302 and an opposite node 306 over a radio bearer in a cell of a wireless network. An optional action 402A illustrates that the network node 304 may receive an availability request from the network assisting node 300, which corresponds to the above action 3:3. In an action 402B, the network node 304 obtains at least one cost related parameter associated with the wireless device in the cell, which may be performed in response to the request of action 402A. This action 402B corresponds to the above action 3:4.

In another action 402C, the network node 304 provides to the network assisting node 300 availability of a potential data bearer dedicated for data of a potential data class in the cell, the potential data class indicating that a certain delay for delivering the data can be tolerated, which availability is dependent on whether the at least one cost related parameter fulfils a threshold condition. This action corresponds to the above action 3:5.

Some optional example embodiments that could be used in the latter procedure will now be described. In one example embodiment, the network node 304 may perform the providing action 402C by sending to the network assisting node 300 a potential data bearer indicator indicating a current availability and/or a predicted availability of said potential data bearer. In this case, some further example embodiments may be that the potential data bearer indicator comprises at least one of an identifier of the potential data class, an indication that the potential data bearer is available, an estimated current bitrate, and a predicted forthcoming bitrate for data of the potential data class.

In some further example embodiments, the at least one cost related parameter may include any of: a channel quality indicator CQI reported by the wireless device, a received signal strength indicator RSSI measured by the wireless device or by the network node, a currently used modulation and coding scheme MCS, the number of active users in the cell, the number of active users in a neighbouring cell, mobility behaviour of the wireless device, and available bandwidth or bitrate at the wireless device's current location.

In another example embodiment, the network node 304 may perform the obtaining action 402B in response to a request for availability of potential data bearer received from the network assisting node, as shown in action 402A.

Procedure in Opposite Node 306

Fourth, the procedure of FIG. 4 will be described in terms of actions performed by the opposite node 306 for handling communication of data with a wireless device 302 which data is communicated over a radio bearer in a cell of a wireless network. It is assumed that the network assisting node 300 has performed actions 400-404.

In an action 404B, the opposite node 306 receives availability of a potential data class, the potential data class indicating that a certain delay for delivering the data can be tolerated, said availability indicating that a potential data bearer can be used for communicating data of the potential data class between the wireless device and the opposite node, which availability is dependent on whether at least one cost related parameter associated with the wireless device fulfils a threshold condition.

The opposite node 306 then classifies the data based on the received availability, in an action 406B, and sends the data in packets comprising a class indication indicating that the respective packets contain data of the potential data class, in a further action 408A. In some example embodiments, the opposite node 306 may in action 404B receive the availability of a potential data class from the network assisting node 300 or from the wireless device 302.

Some advantages of the above-described solution and its embodiments may include the possibility to transmit non-time critical data when the network cost per transmitted bit is low. Thereby:

A) The cell capacity can be increased and utilization of bandwidth and radio resources can be improved.

B) The need of real time data with demanding characteristics can be reduced. For example, the application used for delivery of the data may preload data using potential data bearer when available, before the end user selects the data for consumption which thereby reduces the need for using the realtime or semi-realtime data bearer. Another example could be when video playback of the data at the device is in steady state, which means that the device has a number of seconds of video data buffered. In case the potential data class is available and the cost per transmitted bit is low, the device can increase the buffer size and download additional data, and thus reduce the risk of buffer underflow when the device occasionally enter an area with bad radio coverage. Thereby, the need for using the realtime or semi-realtime data bearer is also reduced.

C) The QoE for services such as content delivery can be improved.

D) Headroom is created for other services with demanding delay/bandwidth characteristics and/or with higher priority, and thereby the revenue for such services can be increased.

When the users are in a position with good radio channel quality and the threshold condition is fulfilled, the potential data bearer is available and can be used. This leads to improved RAN capacity utilization, and optimize UE battery usage, as the cost per bit is lower. This improvement is valid as far as the additional data transmitted doesn't exceed the gain of improved cost per bit.

When the users are in a position with poor radio channel quality, the cost per transmitted bit is high and the threshold condition is not fulfilled, which means that the potential data bearer is not available and only the real time bearer and semi-real time bearer are available. When there are users in the network that use the potential data bearer, the usage of real time and semi-real time bearers is reduced thus making headroom for transmission of delay-sensitive data. Also, as the network capacity utilization is more efficient due to usage of potential data bearer where the cost of transmitted bit is lower, there will be even more headroom for data usage through the real time bearer and/or the semi-real time bearer.

When the users are in a position where the network capacity is higher due to coverage from both New Radio NR and LTE, the potential data bearer is more likely to be available and can be used.

Seen from a network perspective, this solution can reduce the energy consumption for data transmission, and increase the total network capacity, both in terms of available bitrate and headroom for more real time services. Also, several previous real time demanding services with high cost per transmitted bit have been converted to non-real time services with low cost per transmitted bit, despite the extra cost for an increasing amount of unused preloaded/cached data.

Seen from a user and device perspective, this solution can provide battery saving as the average cost per bit is reduced due to the conversion of previous real time demanding services to non-real time services with lower cost per transmitted bit, despite the extra cost of some increasing amount of unused preloaded/cached data.

Seen from an application perspective, this solution can increase the QoE for the end-user, with lower or equivalent cost, as pre-loading/caching of content is now available, and the risk for bad QoE, e.g. due to blocking, variation or degraded content (video) quality, can be reduced.

Figure 5:
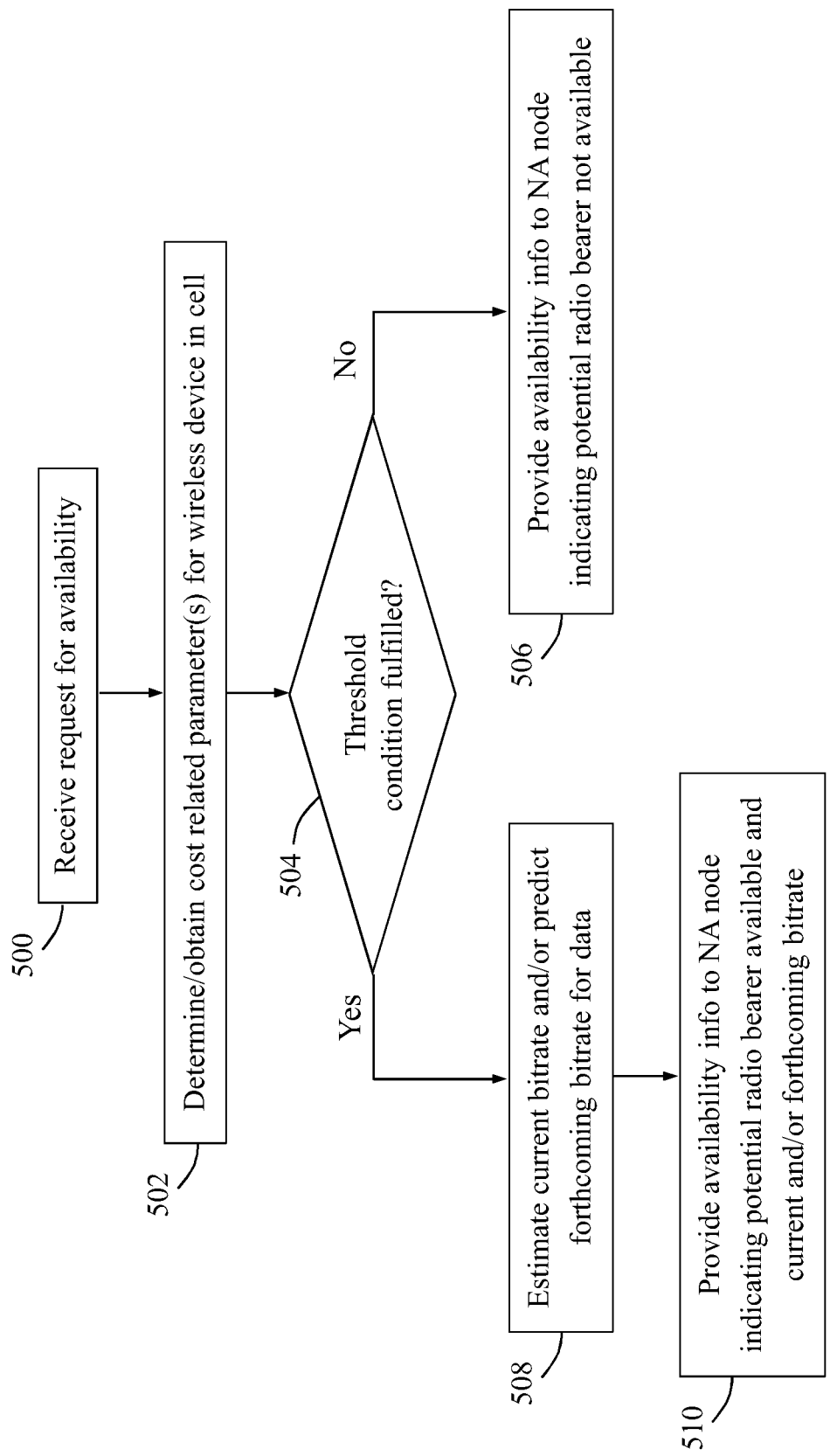
FIG. 5 is a flow chart illustrating an example of how a network node may operate in more detail when employing some of the embodiments herein, according to further example embodiments.

An example of how a network node such as network node 304 may operate in more detail when employing some of the embodiments herein, will now be described with reference to the flow chart in FIG. 5. A first action 500 illustrates that the network node 304 receives a request for availability of the potential data bearer from the network assisting node 300, which corresponds to the above actions 402A and 3:3. In a next action 502, the network node 304 determines or otherwise obtains one or more cost-related parameters for the wireless device in the cell which corresponds to the above actions 402B and 3:4.

Next, the network node 304 evaluates the one or more cost-related parameters to determine whether they fulfil the above-described threshold condition or not, in another action 504. If not, the potential data bearer is deemed to be unavailable and the network node 304 provides availability information to the NA node 300 indicating that the potential data bearer is not available, in an action 506. On the other hand, if the threshold condition is fulfilled in action 504, the network node 304 estimates a current bitrate and/or predicts a forthcoming bitrate that can be achieved when transmitting data on the potential data bearer, in an action 508. Finally, the network node 304 provides availability information to the NA node 300 indicating that the potential data bearer is available as well as the estimated current and/or predicted forthcoming bitrate, in an action 510.

Figure 6:
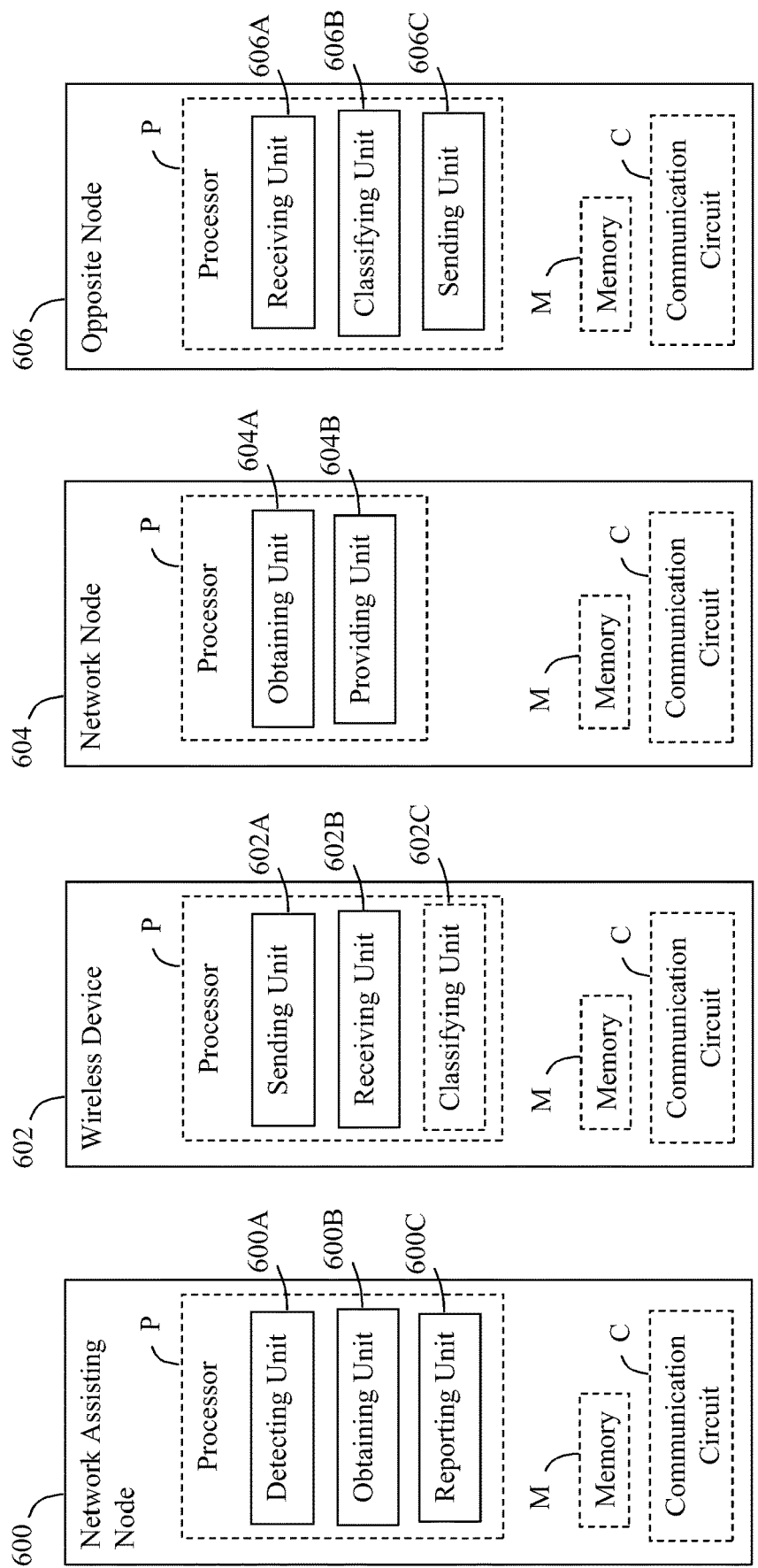
FIG. 6 is a block diagram illustrating how a network assisting node, a wireless device, a network node and an opposite node may be structured, according to further example embodiments.

The block diagram in FIG. 6 illustrates a detailed but non-limiting example of how a network assisting node 600, a wireless device 602, a network node 604 and an opposite node 606, respectively, may be structured to bring about the above-described solution and embodiments thereof. In this figure, the network assisting node 600, the wireless device 602, the network node 604 and the opposite node 606 may be configured to operate according to any of the examples and embodiments of employing the solution as described herein, where appropriate. For example in the manner described above for either of FIGS. 3 and 4. Each of the network assisting node 600, the wireless device 602, the network node 604 and the opposite node 606 is shown to comprise a processor "P", a memory "M" and a communication circuit "C" with suitable equipment for sending and receiving information and messages in the manner described herein.

The communication circuit C in each of the network assisting node 600, the wireless device 602, the network node 604 and the opposite node 606 thus comprises equipment configured for communication with each other using suitable technologies and protocols for the communication depending on the implementation. The solution is however not limited to any specific types of technologies and protocols.

The network assisting node 600 is, e.g. by means of units, modules or the like, configured or arranged to perform the actions 400, 402 and 404 of the flow chart in FIG. 4 and as follows. Further, the wireless device 602 is, e.g. by means of units, modules or the like, configured or arranged to perform at least some of the actions 400A, 404A, 406A and 408B of the flow chart in FIG. 4 and as follows. Further, the network node 604 is, e.g. by means of units, modules or the like, configured or arranged to perform at least some of the actions 402A, 402B and 402C of the flow chart in FIG. 4 and as follows. Further, the opposite node 606 is, e.g. by means of units, modules or the like, configured or arranged to perform at least some of the actions 404B, 406B and 408A of the flow chart in FIG. 4 and as follows.

The network assisting node 600 is arranged to handle communication of data between a wireless device 602 and an opposite node 606 over a radio bearer in a cell of a wireless network. The network assisting node 600 is configured to detect that a potential data class is requested for at least some of the data, the potential data class indicating that a certain delay for delivering the data can be tolerated. This operation may be performed by a detecting unit 600A in the network assisting node 600, and as illustrated in action 400.

The network assisting node 600 is also configured to obtain, from a network node 604 serving said cell, availability of a potential data bearer dedicated for data of said potential data class in the cell, which availability is dependent on whether at least one cost related parameter associated with the wireless device fulfils a threshold condition. This operation may be performed by an obtaining unit 600B in the network assisting node 600, and as illustrated in action 402.

The network assisting node 600 is further configured to report availability of the potential data class to at least one of the wireless device and the opposite node, thereby indicating that the potential data bearer can be used for communicating data of the potential data class between the wireless device and the opposite node. This operation may be performed by a reporting unit 600C in the network assisting node 600, and as illustrated in action 404.

The wireless device 602 is arranged to handle communication of data with an opposite node 606 over a radio bearer in a cell of a wireless network. The wireless device 602 is configured to send to a network assisting node 600 a request for potential data class for at least some of the data, the potential data class indicating that a certain delay for delivering the data can be tolerated. This sending operation may be performed by a sending unit 602A in the wireless device 602, and as illustrated in action 400A.

The wireless device 602 is also configured to receive from the network assisting node availability of the potential data class which availability is dependent on whether at least one cost related parameter associated with the wireless device fulfils a threshold condition. The received availability indicates that the potential data bearer can be used for communicating data of the potential data class between the wireless device and the opposite node. This receiving operation may be performed by a receiving unit 602B in the wireless device 602, and as illustrated in action 404A.

The wireless device 602 may further be configured to classify the data based on the received availability, which may be realized by means of a classifying unit 602C in the wireless device. The wireless device 602 may then be configured to send the data in packets comprising a class indication indicating that the respective packets contain data of the potential data class.

The network node 604 is arranged to handle communication of data between a wireless device 602 and an opposite node 606 over a radio bearer in a cell of a wireless network. The network node 604 is configured to obtain at least one cost related parameter associated with the wireless device in the cell, which operation may be performed by an obtaining unit 604A in the network node 604, and as illustrated in action 402B.

The network node 604 is also configured to provide, to a network assisting node 600, availability of a potential data bearer dedicated for data of a potential data class in the cell, the potential data class indicating that a certain delay for delivering the data can be tolerated. The provided availability is dependent on whether the at least one cost related parameter fulfils a threshold condition, which has been illustrated in FIG. 5. This providing operation may be performed by a providing unit 604B in the network node 604, and as illustrated in action 402C.

The opposite node 606 is arranged to handle communication of data with a wireless device 602 which data is communicated over a radio bearer in a cell of a wireless network. The opposite node 606 is configured to receive availability of a potential data class, the potential data class indicating that a certain delay for delivering the data can be tolerated. The received availability indicates that a potential data bearer can be used for communicating data of the potential data class between the wireless device and the opposite node. The received availability is further dependent on whether at least one cost related parameter associated with the wireless device fulfils a threshold condition. This receiving operation may be performed by a receiving unit 606A in the opposite node 606, and as illustrated in action 404B.

The opposite node 606 is further configured to classify the data based on the received availability, which operation may be performed by a classifying unit 606B in the opposite node 606, and as illustrated in action 406B. The opposite node 606 is also configured to send the data in packets comprising a class indication indicating that the respective packets contain data of the potential data class. This sending operation may be performed by a sending unit 606C in the opposite node 606, and as illustrated in action 408A.

It should be noted that FIG. 6 illustrates various functional units in the network assisting node 600, the wireless device 602, the network node 604 and the opposite node 606, respectively, and the skilled person is able to implement these functional modules in practice using suitable software and hardware equipment. Thus, the solution is generally not limited to the shown structures of the network assisting node 600, the wireless device 602, the network node 604 and the opposite node 606, and the functional units therein may be configured to operate according to any of the features, examples and embodiments described in this disclosure, where appropriate.

The functional units 600A-C, 602A-C, 604A-B, and 606A-C described above may be implemented in the network assisting node 600, the wireless device 602, the network node 604 and the opposite node 606, respectively, by means of program modules of a respective computer program comprising code means which, when run by the processor P causes the network assisting node 600, the wireless device 602, the network node 604 and the opposite node 606 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network assisting node 600, the wireless device 602, the network node 604 and the opposite node 606 in the form of a memory having a computer readable medium and being connected to the processor P. The computer program product or memory M in each of the network assisting node 600, the wireless device 602, the network node 604 and the opposite node 606 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network assisting node 600, wireless device 602, network node 604 and opposite node 606.

The solution described herein may be implemented in each of the network assisting node 600, the wireless device 602, the network node 604 and the opposite node 606 by a computer program comprising instructions which, when executed on at least one processor, cause the at least one processor to carry out the actions according to any of the above embodiments and examples, where appropriate. The solution may also be implemented at each of the network assisting node 600, the wireless device 602, the network node 604 and the opposite node 606 in a program carrier containing the above computer program, wherein the program carrier is one of an electronic signal, optical signal, radio signal, or computer readable storage medium.

Figure 7:
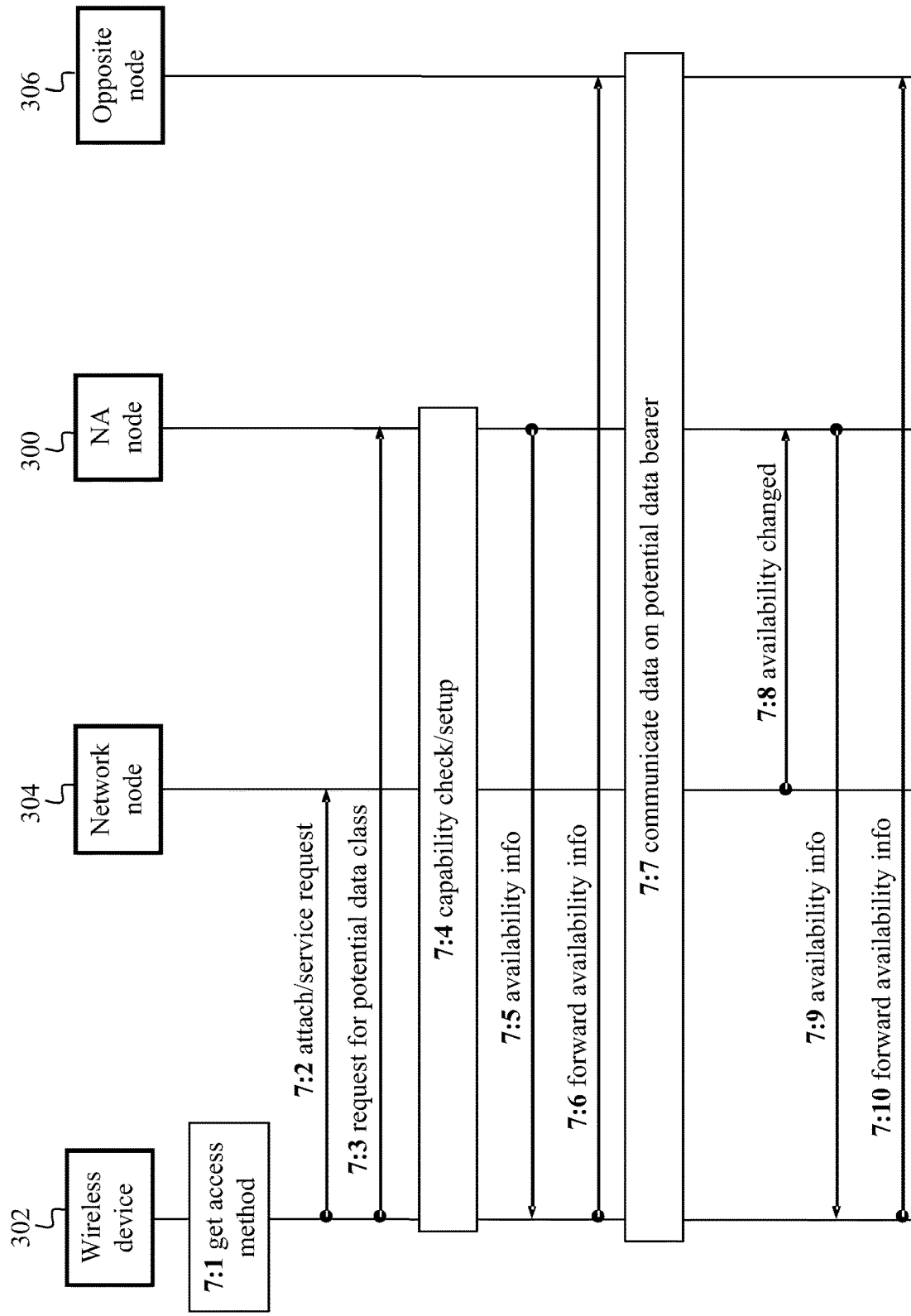
FIG. 7 is a signaling diagram illustrating an example of a procedure when the solution is used, according to further example embodiments.

An example of a procedure when the solution is used will now be described with reference to the signaling diagram in FIG. 7 involving the above-described NA node 300, wireless device 302, network node 304 and opposite node 306. In this example, the above-mentioned potential data class indicator is sent to the wireless device 302 and the wireless device 302 relays this information to the opposite node 306. The procedure in FIG. 7 comprises the following actions:

Action 7:1

The wireless device 302 application obtains the access method to the NA node 300. The access method could be an IP address to the NA node 300. This IP address can be setup manually in the wireless device 302, or by other methods like an initial SMS in connection to setup of APN towards the network.

Action 7:2

UE enters connected mode by e.g. "attach" or "UE triggered service request" procedure according to 3GPP TS23.401, possibly with additions that potential data bearer capability needs to be acknowledged between the network node 304 and a core network. Also, the potential data bearer may in some cases be established within this step.

Action 7:3

The wireless device 302 application client sets up a session to NA node 300 and request to get access to potential data class. One possible architecture of the NA node 300 may be a node located on the IP network level, another possible architecture of the NA node 300 may be reusing a mechanism described in 3GPP TR 26.957, chapter 6.4.

Action 7:4

Potential data bearer for the wireless device 302 will be established here in case it was not already setup in action 7:2.

Action 7:5

The NA node 300 returns a confirmation that the potential data class is supported and reports its initial availability, with the access method as parameter. After this procedure, the application client in wireless device 302 can receive indication on further changes in availability of the potential data class from NA node 300.

Action 7:6

The application client in wireless device 302 relays the potential data class information, with access method as parameter, to the opposite node 306. This information may be transmitted through an application layer. After the opposite node 306 receives this information, it will be able to communicate with the application client in wireless device 302 through the potential data class with the received access method.

Action 7:7

Data is communicated on the potential data bearer.

Action 7:8

In case there is a change in availability of the potential bearer, the network node 304 will inform the NA node 300.

Action 7:9

The NA node 300 sends the availability change of the potential data class as potential data class indicator to the application client in wireless device 302, e.g. through an application session not using the potential data class.

Action 7:10

The application client in wireless device 302 can optionally forward this potential data class indicator to the opposite node 306, e.g. through an application session not using the potential data class.

Figure 8:
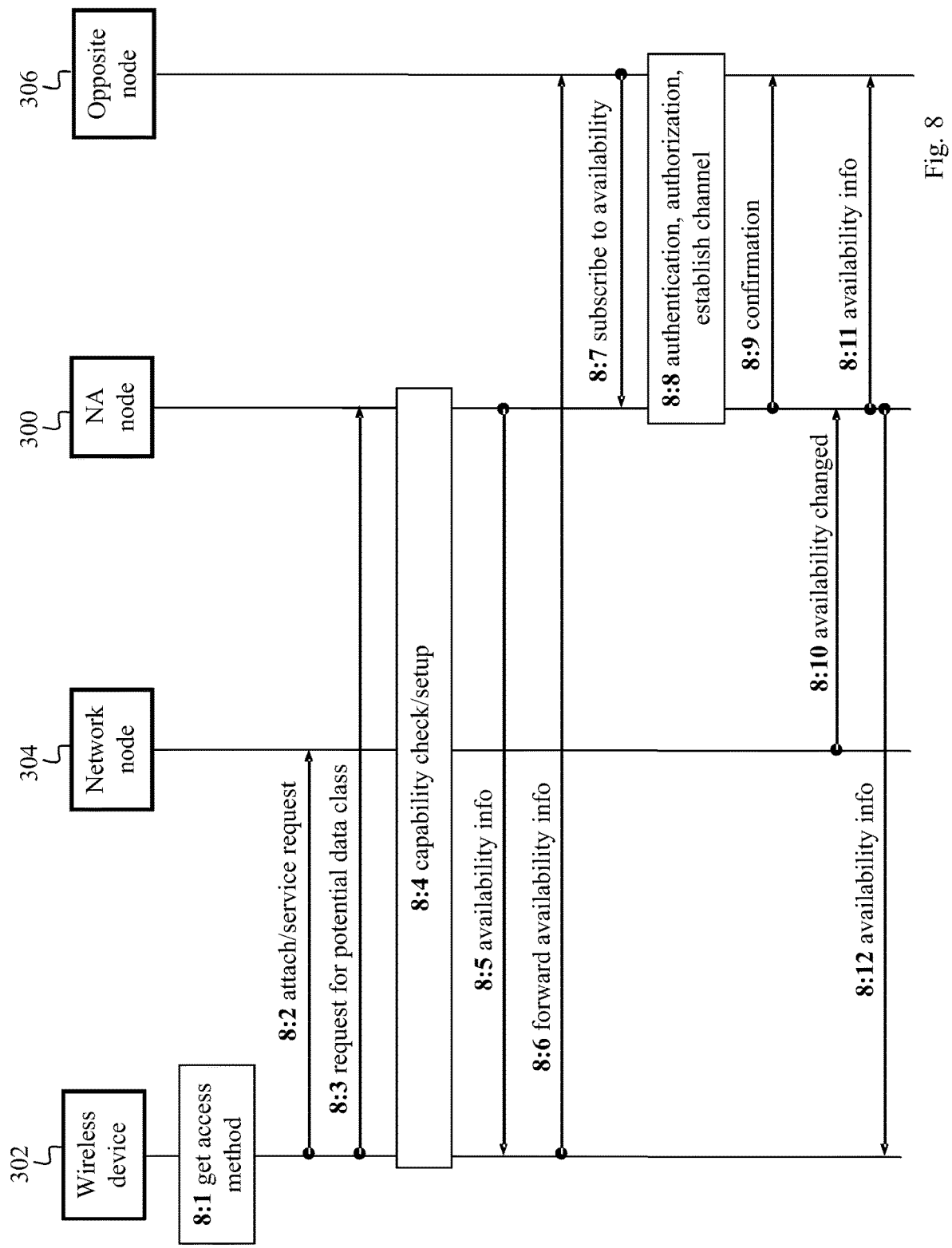
FIG. 8 is a signaling diagram illustrating another example of a procedure when the solution is used, according to further example embodiments.

Another example of a procedure when the solution is used will now be described with reference to the signaling diagram in FIG. 8 again involving the above-described NA node 300, wireless device 302, network node 304 and opposite node 306. In this example, the above-mentioned potential data class indicator is sent directly to both the wireless device 302 and the opposite node 306. The procedure in FIG. 8 comprises the following actions:

Action 8:1

Same as the above-described action 7:1.

Action 8:2

Same as the above-described action 7:2.

Action 8:3

Same as the above-described action 7:3.

Action 8:4

Same as the above-described action 7:4.

Action 8:5

Same as the above-described action 7:5.

Action 8:6

The application client in wireless device 302 relays the potential data class information, with the access method and a network assistance function access method as parameter, to the opposite node 306. This information may be transmitted through an application layer. After the opposite node 306 receives this information, it will be able to communicate with the application client in wireless device 302 through the potential data class with the received access method.

The parameter "network assistance function access method" contains information on how the opposite node 306 could access the NA node 300 for receiving potential data class indicator. It can contain e.g. the IP address of the NA node 300, credential for authentication/authorization to the NA node 300, and an identifier of the potential data class on which the wireless device 302 should be monitored.

Action 8:7

The opposite node 306 can use the network assistance function access method information from the previous action to start up a session to access the NA node 300, and request access to the potential data class indicator through a signal potential data indicator subscription setup.

Action 8:8

In this action, the above credential for authentication/authorization are used for establishing a channel between the NA node 300 and the opposite node 306.

Action 8:9

The NA node 300 replies to the opposite node 306 with a confirmation of subscription, which can optionally also contain current availability information of the potential data class. After the opposite node 306 receives this message it can receive indication on changes in availability of the potential data class from the NA node 300.

Action 8:10

When a change in availability of the potential data bearer occurs, the network node 304 will inform the NA node 300.

Action 8:11

The NA node 300 sends the availability change of the potential data class as potential data class indicator (availability info) to the opposite node 306.

Action 8:12

The NA node 300 may optionally also send the availability change of the potential data class as potential data class indicator (availability info) to the application client in wireless device 302, e.g. through an application session not using the potential data class.

While the solution has been described with reference to specific exemplifying embodiments, the description is generally only intended to illustrate and explain the solution and should not be taken as limiting the scope of the solution. For example, the terms "network assisting node", "wireless device", "network node", "opposite node", "potential data bearer", "potential data class", "potential data class indicator" and "network cost" have been used throughout this disclosure, although any other corresponding entities, functions, and/or parameters could also be used having the features and characteristics described here. The solution is defined by the appended claims.

The invention claimed is:

1. A method performed by a network assisting node for handling communication of data between a wireless device and an opposite node, the method comprising:
   detecting that a data class is requested for at least some of the data, the data class indicating that a certain delay for delivering the data can be tolerated;
   after detecting that the data class is requested, the network assisting node requesting, from a radio access network (RAN) node in wireless communication with the wireless device, Dedicated Radio Bearer availability information indicating whether or not a Dedicated Radio Bearer (DRB) dedicated for data of the data class is available to be used for wireless communications between the wireless device and RAN node;
   receiving, from the RAN node, a response to the request for the Dedicated Radio Bearer availability information, wherein the response to the request for the Dedicated Radio Bearer availability information comprises the requested DRB availability information indicating whether or not the DRB dedicated for the data of the data class is available to be used for wireless communications between the wireless device and the RAN node, which availability is dependent on whether at least one cost related parameter associated with the wireless device fulfils a threshold condition;
   and reporting the availability of the DRB to at least one of the wireless device or the opposite node.

2. The method of claim 1, wherein the received DRB availability information comprises a DRB indicator indicating a current availability and/or a predicted availability of the DRB.

3. The method of claim 2, wherein the data class indicator comprises at least one of: an identifier of the data class, an indication that the DRB is available, an estimated current bitrate, and a predicted forthcoming bitrate for data of the data class.

4. The method of claim 1, wherein the detecting comprises receiving a request for the data class from the wireless device, and the reporting comprises sending a data class indicator to at least one of the wireless device and the opposite node in response to the received request.

5. The method of claim 1, wherein the at least one cost related parameter includes any of: a channel quality indicator (CQI) reported by the wireless device, a received signal strength indicator (RSSI) measured by the wireless device or by the network node, a currently used modulation and coding scheme (MCS), the number of active users in the cell, the number of active users in a neighbouring cell, mobility behaviour of the wireless device or available bandwidth or bitrate at the wireless device's current location.

6. A computer program product comprising a non-transitory computer readable medium storing a computer program comprising instructions, which, when executed by processing circuitry of a network assisting node, causes the network assisting node to perform the method of claim 1.

7. The method of claim 1, wherein the wireless device is a user terminal, and the method comprises reporting the availability of the DRB to the opposite node.

8. A network assisting node arranged to handle communication of data between a wireless device and an opposite node, wherein the network assisting node comprises processing circuitry configured to cause the network assisting node to:
   detect that a data class is requested for at least some of the data, the data class indicating that a certain delay for delivering the data can be tolerated;
   after detecting that the data class is requested, request, from a radio access network (RAN) node in wireless communication with the wireless device, Dedicated Radio Bearer availability information indicating whether or not a Dedicated Radio Bearer (DRB) dedicated for data of the data class is available to be used for wireless communications between the wireless device and RAN node;
   receive, from the RAN node, a response to the request, wherein the response comprises the requested DRB availability information indicating whether or not the DRB dedicated for the data of the data class is available to be used for wireless communications between the wireless device and the RAN node, which availability is dependent on whether at least one cost related parameter associated with the wireless device fulfils a threshold condition; and
   report the availability of the DRB to at least one of the wireless device or the opposite node.

9. The network assisting node of claim 8, wherein the received DRB availability information comprises a DRB indicator indicating a current availability and/or a predicted availability of the DRB.

10. The network assisting node of claim 8, wherein the network assisting node is configured to receive a request for data class from the wireless device, and to report the availability of the data class by sending a data class indicator to at least one of the wireless device and the opposite node in response to the received request.

11. The network assisting node of claim 10, wherein the data class indicator comprises at least one of: an identifier of the data class, an indication that the DRB is available, an estimated current bitrate, and a predicted forthcoming bitrate for data of the data class.

12. The network assisting node of claim 8, wherein the at least one cost related parameter includes any of: a channel quality indicator CQI reported by the wireless device, a received signal strength indicator RSSI measured by the wireless device or by the network node, a currently used modulation and coding scheme MCS, the number of active users in the cell, the number of active users in a neighboring cell, mobility behavior of the wireless device, and available bandwidth or bitrate at the wireless device's current location.

13. A method performed by a wireless device for handling communication of data with an opposite node via a Radio Access Network (RAN) node, the method comprising:
   establishing a wireless connection with the RAN node;
   sending, via the RAN node, to a network assisting node a request for Dedicated Radio Bearer (DRB) availability information indicating whether or not a Dedicated Radio Bearer (DRB) dedicated for a requested data class is available to be used by the wireless device to wirelessly transmit data of the data class to the RAN node;

and receiving from the network assisting node a response message responsive to the request for the DRB availability information, the response message comprising the requested DRB availability information indicating whether or not the DRB dedicated for the requested data class is available to be used by the wireless device to transmit data of the data class to the RAN node, wherein whether or not the DRB is available to be used by the wireless device is dependent on whether at least one cost related parameter associated with the wireless device fulfils a threshold condition.

14. The method of claim 13, further comprising:
classifying the data based on the received availability;
and sending the data in packets comprising a class indication indicating that the respective packets contain data of the data class.

15. The method of claim 13, wherein the wireless device is a user terminal, and the user terminal forwards the DRB availability information to the opposite node.

16. A computer program product comprising a non-transitory computer readable medium storing a computer program comprising instructions, which, when executed by processing circuitry of a wireless device, causes the network assisting node to perform the method of claim 13.

17. A wireless device arranged to handle communication of data with an opposite node via a Radio Access Network (RAN) node, wherein the wireless device comprises processing circuitry configured to cause the wireless device to:

establish a wireless connection with the RAN node;
send, via the RAN node, to a network assisting node a request for Dedicated Radio Bearer (DRB) availability information indicating whether or not a Dedicated Radio Bearer (DRB) dedicated for a requested data class is available to be used by the wireless device to wirelessly transmit data of the data class to the RAN node; and receive from the network assisting node a response message responsive to the request, the response message comprising the requested DRB availability information indicating whether or not the DRB dedicated for the requested data class is available to be used by the wireless device to transmit data of the data class to the RAN node, wherein whether or not the DRB is available to be used by the wireless device is dependent on whether at least one cost related parameter associated with the wireless device fulfils a threshold condition.

18. The wireless device of claim 17, wherein the wireless device is configured to classify the data based on the received availability, and to send the data in packets comprising a class indication indicating that the respective packets contain data of the data class.

19. The wireless device of claim 17, wherein the wireless device is configured to forward the availability to the opposite node as a basis for classification of the data.

* * * * *